US006879477B2

United States Patent
Stahuber

(10) Patent No.: US 6,879,477 B2
(45) Date of Patent: Apr. 12, 2005

(54) POWER SWITCHING DEVICE IN AN ELECTRICAL POWER DISTRIBUTION SYSTEM ON BOARD A HELICOPTER

(75) Inventor: Bernhard Stahuber, Miesbach (DE)

(73) Assignee: Eurocopter Deutschland GmbH, Donauworth (DE)

( * ) Notice: Subject to any disclaimer, the term of this patent is extended or adjusted under 35 U.S.C. 154(b) by 547 days.

(21) Appl. No.: 09/951,271

(22) Filed: Sep. 13, 2001

(65) Prior Publication Data

US 2002/0030956 A1 Mar. 14, 2002

(30) Foreign Application Priority Data

Sep. 14, 2000 (DE) .......................................... 100 45 446

(51) Int. Cl.[7] .............................................. H02H 5/04
(52) U.S. Cl. ..................................... 361/91.4; 361/103
(58) Field of Search .......................... 361/58, 91.4, 20, 361/21, 24, 62, 63, 64; 219/483, 485

(56) References Cited

U.S. PATENT DOCUMENTS

| | | | | |
|---|---|---|---|---|
| 4,292,502 A | * | 9/1981 | Adams | ........................ 219/483 |
| 4,814,579 A | * | 3/1989 | Mathis et al. | ................ 219/202 |
| 5,457,757 A | | 10/1995 | Kidder | |
| 5,544,842 A | * | 8/1996 | Smith et al. | ................. 244/1 R |
| 6,522,542 B1 | * | 2/2003 | Gordon et al. | .............. 361/704 |

* cited by examiner

Primary Examiner—Stephen W. Jackson
Assistant Examiner—Danny Nguyen
(74) Attorney, Agent, or Firm—Collard & Roe, P.C.

(57) ABSTRACT

A power switching device in an electrical power distribution system on board a helicopter. There is a power switching device that switches on or off the power flow from a main distributor to the consumer. This switching device comprises an overhead panel with a switching means. This device improves the functional safety of electrical and electronic devices in the helicopter by reducing the electromagnetic influence without increasing the weight of the shielding technology and without requiring additional space in the helicopter airframe. With this device there is at least one fuse panel that is in electrical communication with a main distributor. The main distributor has an electrically protective switch which is connected to a power supply connection and a consumer connection. The electronic protective switch is controllable by a control unit which is connected to a control switch on the overhead panel via a fiber optic cable. This control switch receives a control signal from a base light emitter via an additional fiber optic cable. This light emitter detects the voltage at the power supply connection and forms the control signal.

5 Claims, 2 Drawing Sheets

POWER SWITCHING DEVICE IN AN ELECTRICAL POWER DISTRIBUTION SYSTEM ON BOARD A HELICOPTER

BACKGROUND OF THE INVENTION

Field of the Invention

The invention relates to a power switching device in an electrical power distribution system on board a helicopter. The power switching device switches on or off the power flow from a main distributor to the consumer. This device comprises an overhead panel having a switching means.

In a helicopter, numerous electrical and electronic devices are installed in a very confined space. Any reference to electrical equipment, devices or modules in this document also includes electronic equipment, devices or modules. These devices or modules are susceptible to electromagnetic influence. This influence may be in the form of electromagnetic irradiation or electromagnetic emission. Electromagnetic compatibility is represented by the term EMC. Electromagnetic compatibility (EMC) refers to the ability of electrical equipment to function in a satisfactory manner in its electromagnetic surroundings without unduly influencing these surroundings.

If electrical equipment of all types does not mutually interfere or limit mutual function, electromagnetic compatibility exists. Only the existence of electromagnetic compatibility makes it possible to operate equipment, devices or modules without any problems.

In other words, the interference emission of a device must be below the resistance to interference of another device. This relates to aerials or electronic devices in general.

Electrical devices and cables can be found which also exert an electromagnetic influence unless they are equipped with the required shielding technology.

The power supply cables in a helicopter are a principal source of electromagnet influence. This is a direct voltage network which supplies high-current to consumers and low-currents to consumers. In the present systems, these power supply cables are routed in a mutual cable harness. This harness also includes control lines.

In this type harness, there can be conducted emission or inductive disturbance from the "transmitter line" (e.g. high current cable) to a "receiver cable." A so-called "receiver cable" leads to a low-current consumer or it can be a sensitive aerial.

Because of the restricted available space, it is rarely possible to have a separate routing of the cable harness so as to keep apart interfering and interfered-with cables. According to the state of the art, battery and direct voltage generators supply the electrical power to a main distributor or master box. The main distributor forms part of the power distribution system. The power distribution system comprises technical means for distributing and switching the electrical power from the power source to the consumer.

The main distributor is arranged in the rear part of the helicopter airframe. From the main distributor the electrical power flows via a multitude of power carrying cables to a switchable panel which is arranged overhead in the cockpit, on the ceiling panel of the helicopter airframe. There, the power supply cables lead to mechanically operating switching means and to fuses. Switching means can include electrical or electronic switches for opening and closing an electrical circuit. The overhead panel, which is arranged in the cockpit on the ceiling panel of the helicopter airframe, contains a switching device which switches on or off the power flow to consumers. From this panel, additional power carrying cables lead to the individual consumers. These consumers are for example, the avionics computer, the navigation computer, special equipment such as rescue winch, a search light, an air conditioning unit, radar equipment, a computer for operating the power plants and the auto pilot. Significant high-current consumers include the winch, lights and air conditioning unit.

The power switching device comprises at least the overhead panel with the switches and cable connections. Essentially, the power distribution system handles the power flow from the main distributor to the consumers.

To keep the electromagnetic influence as low as possible, such as within a specified tolerance range, electrical cables and devices are shielded via shielding technology. One example of shielding technology in the case of control lines and power supply cables consists of twisting the electrical conductors or routing the individual cable underneath a sheath of metal strand. To ensure potential equalization of the electromagnetic influence, the sheath of metal strand must be connected to a collective ribbon made of metal.

Unfortunately, using this type of shielding technology generates increased weight of the entire electrical and electronic system. Because of restricted available space, it is rarely possible to have separate routing of power supply cables and control lines for high-current consumers and low-current consumers. These cables are thus routed together in cable harnesses. In spite of shielding technology, there are substantial interference fields which can lead to interference in the systems of aerials, control and navigation. These interference fields can be input at the cable harness in control lines for devices. The functional quality of these devices, which are subject to interference, is then often outside the tolerance range. The failure of individual devices or their modules can occur in which the final analysis will significantly influence the operational safety of the helicopter.

In the construction of helicopter airframes, fiber reinforced materials are used which are transparent to external electromagnetic interference fields. They provide only conditional shielding, with laminated-in metal mesh, against external electromagnetic influence. This shielding does not provide complete attenuation against irradiation from external interference transmitters. The metal mesh realizes the principle of the Faraday cage. Individual sections of metal mesh have to be connected to the collective ribbon made of metal. This measure also has the problem of increased weight.

SUMMARY OF THE INVENTION

Thus it is the object of the invention to further improve functional safety of electrical and electronic devices in the helicopter. This is achieved by the present invention by reducing the electromagnetic influence without increasing the weight of the shielding technology and without requiring additional space in the helicopter airframe.

This object is met whereby at least one fuse panel electrically communicating with a main distributor has at least one electronic protective switch. This switch is connected to a power supply connection and a consumer connection. This electronic protective switch is controllable by a control unit which is connected to a control switch on the overhead panel via a fiber optic cable. The control switch receives a control signal from a base light emitter, via a fiber optic cable, with the base light emitter detecting the voltage at the power supply connection and forming the control signal.

One fiber optic cable should be arranged for supplying a common control signal from a base light emitter to several control switches. The fiber optic cable forms a star point at the other end which can be connected to the individual control switches. Since fiber optic cables are used between an electronic fuse panel which corresponds to an electronic fuse computer unit and the overhead panel, electromagnetic influence can be significantly reduced. One advantage is that there are no power carrying cables between the main distributor and the overhead panel. This results in a significant reduction in cabling weight.

For example, while previously each consumer required two current-carrying cables at the overhead panel, now only one fiber optic cable for each consumer is needed. The previously existing direct power circuit which switches on or off the current flow to the individual consumers in the overhead panel has been relocated in the direction of the main distributor, to the fuse panel at the main distributor. Thus, this fuse panel at the main distributor is a new arrangement.

The current flow to the consumer is now switched on or off via an electronic protective switch on the fuse panel. The fuse panel is directly connected to the main distributor. The electronic protective switch forms a module with a semiconductor component which can be a CMOS power switch which switches the power flow. The presence of direct voltage at the main distributor, and thus at the fuse panel, and finally at the input of the electronic switch, is shown by a base light emitter generating a light signal at that location. This light signal is conveyed via fiber optic cable to a star point and from there to each optical switch at the overhead panel. This light signal corresponds to a control signal for the control logic of a control unit of the electronic protective switch.

This electronic protective switch is connected to the electronic control unit which controls the electronic protective switch to assume a closed or an open position. Thus, for each protective switch, one fiber optic cable is arranged between the fuse panel and the overhead panel.

Successful switching of the electronic protective switch can trigger a light signal when a channel light emitter is arranged on the output side at the protective switch. This light signal is then sent to a display light emitter in the overhead panel, through the already existing fiber optic cable. There, the display light emitter lights up, indicating the closing state of the protective switch. Thus, the control unit receives its control signals from the control switch on the overhead panel. The control logic triggers the CMOS power switch. In the closed position of the protective switch, via an overcurrent protection device, any exceeding of a limiting current value by a fault current is monitored. The fault current triggers a fault current signal in the overcurrent protection device. This fault current signal controls the control unit so that the electronic protective switch opens, thus interrupting the current flow.

By using fiber optic cables between the fuse panel and the overhead panel, additional cabling space becomes available which now makes it possible to route power supply lines from the fuse panel individually, using shielding technology. These cables are spatially more unimpeded and more resistant to interference. Starting from the fuse panel, a star-shaped distribution of the power supply cables to consumers becomes possible. This design results in a significant reduction in electromagnetic emission. Furthermore, in the case of low-current consumers, the star-shaped distribution can continue to be provided by a twisted line.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1:
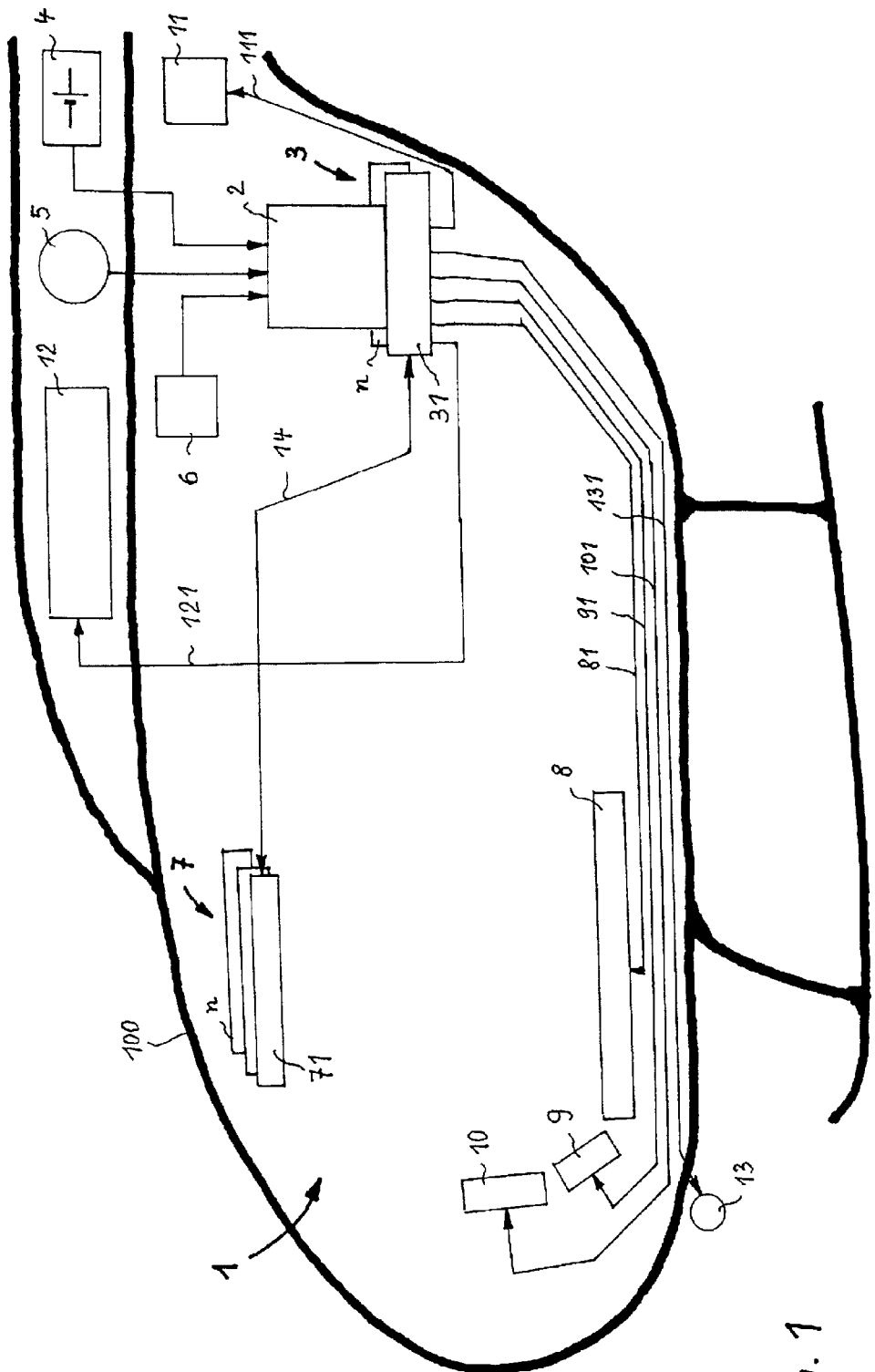
FIG. 1 is a diagram of the power distribution system with power switching device on board a helicopter.

Referring to the drawings, FIG. 1 shows a longitudinal section of the contour of a helicopter airframe 100. Within the helicopter airframe 100, a power distribution system 1 is shown in block diagram form with significant power consumers. In principle, power distribution system 1 comprises a main distributor 2 with at least one fuse panel or electronic fuse unit 3. Main distributor 2 receives electricity from a battery 4 or from a direct voltage generator 5. They are mutually switchable to main distributor 2 so that at least battery 4 or generator 5 feeds into main distributor 2. Main distributor 2 can be activated or separated from the power supply by means of an on-board connector 6. This corresponds to a main switch. Main distributor 2 can supply the direct voltage to fuse panel 3.

Fuse panel 3 can comprise several individual fuse panel sections. This design can depend on the safety concept. For example, in the case of a dual power supply using two generators, the fuse panel can be of duplex design. The number of the sections of the fuse panel depends on the number of consumers. A fuse panel 3 thus comprises at least one fuse panel section 31.

In the case of a section of the fuse panel, fuse panel 3 comprises at least one switching means. The switching means handles the switching of the current flow in the power distribution system 1.

Thus, there is no more switching under load from the overhead panel. This results in improved electromagnetic compatibility as well as spatial improvement for cable routing. In this case the switching means is formed by an electronic protective switch.

In relation to a consumer, the main distributor 2 is connected to the input of an electronic protective switch of fuse panel 3 through a power cable. From each individual electronic protective switch extends an individual cable in the form of a cable channel 81, 91, 101, 111, 121, 131 to a consumer. These consumers are an air conditioning unit 8, a rescue winch 9, a radar vision device 10, an avionics computer 11, a plurality of electrical modules 12 of the power plant, an outboard lighting 13 and others. There is no need for a second cable to the consumer because main distributor 2 and the consumer in the direct voltage system are interconnected via a common electrical collective line in the form of a collective ribbon (not shown).

Furthermore, the number of sections of the fuse panel can be optimized for inspection requirements and for the available space for installation.

Through an overhead panel 7, via fiber optic cable 14, the individual electronic protective switches of fuse panel 3 are controlled to open or close the flow of current.

Figure 2:
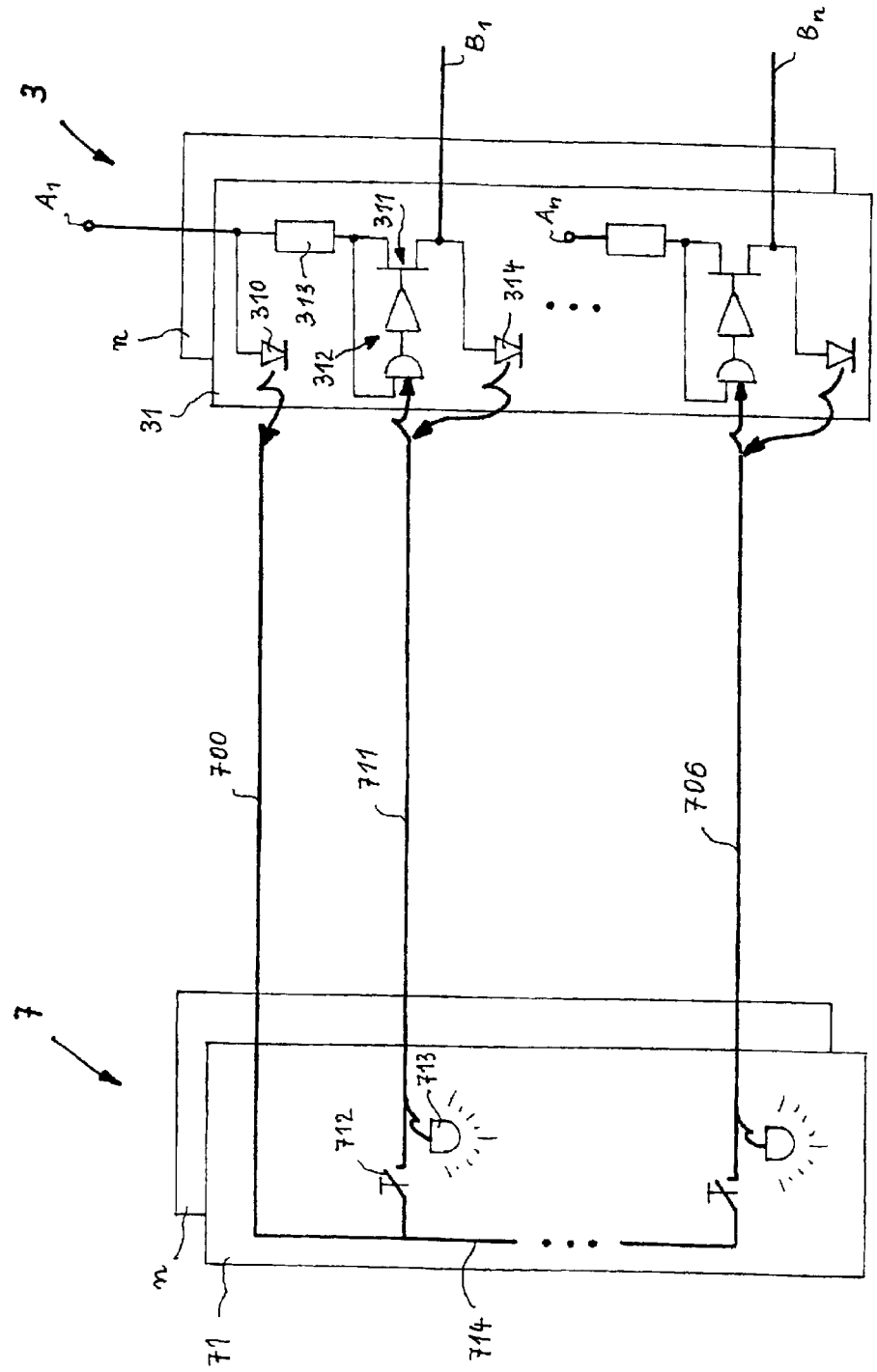
FIG. 2 is a diagram of the power switching device.

FIG. 2 shows additional details and characteristics of fuse panel 3 and overhead panel 7 shown in FIG. 1. According to FIG. 2, several sections 31 of fuse panel 31 to n are indicated, together with the same corresponding number of overhead panel sections 71 to n. The individual sections 31 ... n of the fuse panel and the individual sections 71 ... n of the overhead panels can be taken together as individual modules, each forming an individual device of the fuse panel 3 and the overhead panel 7.

The following explanations refer to an individual section 31 of the fuse panel and its interaction with a section 71 of the overhead panel; these explanations generally apply to additional sections N of the fuse panel or additional sections N of the overhead panel, and thus to the fuse panel 3 and the overhead panel 7.

Section 31 of the fuse panel comprises at least one electronic protective switch 311 with an electronic control unit 312, an overcurrent protection device 313 designed as a shunt device 313 and a channel light emitter 314. One input of control unit 312 and the output of channel light emitter 314 are connected via two way optocoupler (not shown) to an fiber optic cable 711. The other end of fiber optic cable 711 is connected to an optoelectronic control switch 712 of a section 71 of the overhead panel. This equipment on section 31 of the fuse panel can be repeated n-times, according to the number n of consumers.

Furthermore, section 31 of fuse panel 3 comprises an individual base light emitter 310 which is connected to one of the power supply cables, such as cable $A_1$ Section 71 of overhead panel 7 comprises at least one optoelectronic control switch 712 and a display light emitter 713. This equipment can be repeated n-times on section 71 of the overhead panel.

Furthermore, at that location, a star point 714 for connecting fiber optic cables of additional control switches n is arranged.

One fiber optic cable for each protective switch is routed between section 31 of the fuse panel and section 71 of the overhead panel. When starting up main distributor 2 with voltage, by activating on-board connector 6, voltage is supplied to the power supply connections $A_1 \ldots A_n$. At the same time, with voltage present at the power supply connection $A_1$, base light emitter 310 starts up. One advantage is that this base light emitter 310 is located on the section 31 of the fuse panel and is connected to an optocoupler (not shown) which accommodates fiber optic cable 700.

Base light emitter 310 can continuously supply a stationary light signal or, with a respective additional switching device, can supply pulsing light signals. This stationary light signal or pulsing light signal is transmitted in fiber optic cable 700 up to control switch 712 on section 71 of the overhead panel. Control switch 712 can, for example, be a manual push-button switch. Depending on the state of section 31 of the fuse panel, the surface of the push-button switch can be illuminated by this light. This indicates to the crew that the power supply is on and that the control signal for switching the electronic protective switch 311 is ready. By touching or pressing the push-button switch, the beam path is closed and the control signal is transmitted onward to control unit 312. Control unit 312 corresponds to an electronic logical module which closes the electronic protective switch 311 when the control signal (light signal) arrives, thus forwarding the current flow from electronic protective switch 311 of section 31 of the fuse panel onward to a cable channel $B_1$ directly to the consumer. The presence of current at the control unit 312 is a further prerequisite for the switching action.

If such switching-on of the consumer at section 31 of the fuse panel was successful, a light signal is generated through a channel light emitter 314 which on fuse panel 31 is connected (at the output side) to the cable channel $B_1$ (power supply cable). This light signal is also transmitted, via another optocoupler (not shown), to the already present fiber optic cable 711 and at section 71 of the overhead panel activates a display light emitter 713. This display light emitter 713 is arranged adjacent to control switch 712.

The light signal provided by base light emitter 310 of a fuse panel 31 can be used as a control signal for all optoelectronic control switches 712 on section 71 of the overhead panel. This is achieved in that the fiber optic cable 700 can be used as a star point 714 for all optoelectronic control switches of part 71 of the overhead panel. This is an efficient way of providing the control signal. By way of branch points on this fiber optic cable 700, further control switches can be connected.

By pushing the button or touching the push-button switch, the contacts are closed. This design opens the way for the control signal, which is a light signal, to control unit 312 which as a logical module converts the light signal to an electrical signal. The electrical signal then controls a semiconductor component which acts as an electronic protective switch 311, for example a CMOS power switch.

The electronic protective switch 311 is monitored by current, such as a current value outside a specified tolerance range that causes protective switch 311 to open. Opening of protective switch 311 can also take place by an automatic reset by means of a reset button (not shown). The reset function could also be formed by an additional push-button switch. The trigger values for the electronic protective switch are analogous to the maximum current which is permitted to flow through the electronic protective switch. On a shunt device, the trigger values for the current can be individually set for each electronic protective switch. In shunt device 313, the current flowing through a resistor is measured. In the case of a fault current, a fault current protective circuit (not shown) provides a signal to the control unit 312 to open the protective switch 311. The overcurrent device 313 is located on the section 31 of the fuse panel. The overcurrent device 313 creates protection for the protective switch 311, with overcurrent device 313 working with a shunt.

The design of control switch 712 is similar to that of a known electrical switch. The crew of the helicopter can set control switch 712 either to an open position or to a closed position.

A precision mechanical lever, driven by a push-button switch, blocks the light flow at that location by interrupting the beam path of the light. This takes place by a screen being pushed between two optical lenses. If the screen is pulled out of the beam path, the light can be freely emitted. The transition at the optical lens has a slight attenuation. The attenuation value in the described application is negligible. A fiber optic relay also functions in a similar way. There, the screen is moved by a lifting magnet. When the finger is removed from the push-button switch, control switch 712 opens again and the beam path is interrupted. Nevertheless electronic protective switch 311 remains in the closed state.

Within a fiber optic cable 711, light signals of various wavelengths can be transmitted in parallel. In this sense, to indicate "readiness for switching", base light emitter 311 emits a light having a frequency which differs from the light emitted by channel light emitter 314 to indicate the "closed state" in the same fiber optic cable 711.

Accordingly, while several embodiments of the present invention have been shown and described, it is to be understood that many changes and modifications may be made thereunto without departing from the spirit and scope of the invention as defined in the appended claims.

What is claimed is:

1. A power switching device for a helicopter having an overhead panel and at least one switching means disposed in the overhead panel, the the power switching device comprising:
   a) at least one fuse panel in electrical communication with the overhead panel;
   b) an electrical distribution system with a main distributor in electrical communication with said at least one fuse panel;
   c) at least one electronic protective switch disposed in said fuse panel;
   d) at least one power supply connection electrically coupled to said at least one electronic protective switch;
   e) at least one control unit electrically coupled to said electronic protective switch;
   f) a fiber optic cable coupled to said at least one control unit;
   g) at least one control switch coupled to said fiber optic cable;
   h) at least one additional fiber optic cable coupled to said at least one control switch; and
   i) at least one base light emitter coupled to said at least one additional fiber optic cable wherein said at least one base light emitter detects a voltage at said power supply connection from a control signal sent from said at least one base light emitter.

2. The power switching device as in claim 1, further comprising at least one additional control switch wherein said additional fiber optic cable supplies a common control signal from said base light emitter to said at least one control switch and to said at least one additional control switch.

3. The power switching device as in claim 2, wherein said additional fiber optic cable has at least one end that forms a star point wherein said at least one control switch is coupled to said star point.

4. The power switching device as in claim 1, wherein said at least one electronic protective switch includes at least two electronic protective switches.

5. The power switching device according to claim 1, further comprising at least one overcurrent protection device coupled between said at least one power supply connection and said at least one electronic protective switch so that upon the occurrence of a fault current, said at least one overcurrent protection device sends a signal to an input of said at least one control unit so that said at least one control unit controls an opening of said at least one protective switch.

* * * * *